Patented Feb. 26, 1924.

1,485,071

UNITED STATES PATENT OFFICE.

WOODMAN W. CLOUGH AND CARL O. JOHNS, OF ELIZABETH, NEW JERSEY, ASSIGNORS TO STANDARD DEVELOPMENT COMPANY, A CORPORATION OF DELAWARE.

SOLVENT FOR ORGANIC COMPOUNDS AND THE RESULTING COMPOSITIONS.

No Drawing. Application filed March 13, 1922. Serial No. 543,484.

*To all whom it may concern:*

Be it known that we, WOODMAN W. CLOUGH and CARL O. JOHNS, citizens of the United States, residing at Elizabeth, in the county of Union and State of New Jersey, have invented new and useful Improvements in Solvents for Organic Compounds and the Resulting Compositions, of which the following is a specification.

The present application relates to liquid compositions of matter particularly suitable for use as solvents especially for organic compounds, such as cellulose nitrate and for general application, and will be fully understood from the following description.

The liquid composition of matter, in accordance with the present invention, is a mixture of isopropyl acetate and isopropyl alcohol characterized in that it is of constant boiling-point, this boiling-point being about 80.1° C. at 760 mm. pressure. This mixture has a specific gravity of 0.824 at 15° C. and contains 47.5% of isopropyl acetate and 52.5% by weight of anhydrous isopropyl alcohol.

As is readily apparent, the boiling-point of the constant boiling-point mixture and the precise proportion of its constituents, will vary somewhat with pressure conditions.

The mixture may be prepared by admixing the ingredients in the proper proportions or by distilling a mixture containing the ingredients not in proper proportion to form a constant boiling-point mixture and segregating from the distillate that portion having a constant boiling-point. It is an excellent solvent for many organic compounds, and particularly for cellulose nitrate, of which solutions containing up to about 35%, depending on the thickness of the solution desired, are suitable for use as varnishes, for forming film, filaments, etc., and for explosives.

We claim:

1. A constant boiling-point mixture of isopropyl acetate and isopropyl alcohol.

2. A liquid composition of matter containing about 47.5% of isopropyl acetate and about 52.5% of isopropyl alcohol and having a boiling-point of about 80.1° C.

3. As a composition of matter, a solution of cellulose nitrates in a constant boiling-point mixture of isopropyl acetate and isopropyl alcohol.

4. As a composition of matter, a solution of cellulose nitrates in a mixture of isopropyl acetate and isopropyl alcohol.

WOODMAN W. CLOUGH.
CARL O. JOHNS.